“United States Patent Office” — 3,285,879 — Patented Nov. 15, 1966

3,285,879
CURING OF ISOCYANATE-TERMINATED POLY-
URETHANE POLYMERS WITH N-MONOALKYL-
AROMATIC DIAMINES
John R. Larson, Wood Dale, and Charles M. Hayes, Hoffman Estates, Ill., assignors to Universal Oil Products Company, Des Plaines, Ill., a corporation of Delaware
No Drawing. Filed Jan. 31, 1963, Ser. No. 255,184
5 Claims. (Cl. 260—77.5)

This invention relates to the curing of isocyanate-terminated polyurethane prepolymers and more particularly to the use of a novel curing agent in effecting the curing.

A recent development in the resin field is the manufacture of polyurethane resins. These resins are prepared by the reaction of an isocyanate with a polyol or polyester. Many diverse products are formed, depending upon the particular isocyanate and the particular polyol or polyester used in the reaction, and also whether the reaction is effected in an anhydrous atmosphere or in the presence of moisture, as well as on other processing conditions. In one method in which a polyol containing 3 or more functional groups is employed, the isocyanate itself acts as a curing agent in forming the desired resin. In another method in which a polyol containing only 2 functional groups is employed, an isocyanate-terminated polymer is formed, which polymer is referred to in the art as a prepolymer. This prepolymer then is reacted with a curing agent to effect cross-linking and to form the desired resin.

Various amine type compounds have been studied for use as curing agents. In general, it has been found that polyamines containing only primary amine groups react too fast and, therefore, do not provide sufficient pot life in order to permit satisfactory handling of the mixture. One method adopted in the prior art to increase the pot life of the mixture is the use of certain chlorinated amine compounds, of which methylene-bis-ortho-chloroaniline (referred to in the art as MOCA) and 3,3'-dichlorobenzidine (referred to in the art as DCB) are illustrative. Curing of the isocyanate-terminated polyurethane prepolymer with these chlorinated amine compounds results in a hard rubbery product.

It has now been found that the use of a different type of amine compound avoids the objection of a short pot life and, surprisingly, produces a soft rubbery resin. This rubbery product is highly flexible and offers advantages for use as cushioning for furniture and automobiles, matting under carpeting, insulation material, etc.

In one embodiment the present invention relates to a method of curing an isocyanate-terminated polyurethane prepolymer which comprises admixing an N-monoalkyl-aromatic diamine with said polymer.

From the hereinbefore embodiment, it will be noted that the novel curing agent of the present invention is an N-monoalkyl-aromatic diamine. As hereinbefore set forth, surprisingly the use of such a curing agent results both in a practical pot life and in a soft, highly flexible rubbery product. For example, these improved results were obtained when using N-octyl-p-phenylenediamine as the curing agent. In contrast, the use of p-phenylenediamine results in a very fast reaction and, therefore, will not give a sufficient pot life for practical purposes. It is apparent that a reasonable pot life is necessary so that the mixture may be poured or otherwise transported into suitable moldings, castings, etc., in order to prepare the desired forms.

In a preferred embodiment of the invention, the N-monoalkyl-aromatic diamine is an N-monoalkyl-p-phenylenediamine. The alkyl group may contain from 1 to 20 or more carbon atoms and, in a preferred embodiment, comprises a secondary alkyl group containing from about 4 to about 12 carbon atoms. Illustrative preferred curing agents comprise N-sec-butyl-p-phenylenediamine,
N-sec-pentyl-p-phenylenediamine,
N-sec-hexyl-p-phenylenediamine,
N-sec-heptyl-p-phenylenediamine,
N-sec-octyl-p-phenylenediamine,
N-sec-nonyl-p-phenylenediamine,
N-sec-decyl-p-phenylenediamine,
N-sec-undecyl-p-phenylenediamine,
N-sec-dodecyl-p-phenylenediamine, etc.

Other N-monoalkyl-p-phenylenediamines include

N-isopropyl-p-phenylenediamine,
N-sec-tridecyl-p-phenylenediamine,
N-sec-tetradecyl-p-phenylenediamine,
N-sec-pentadecyl-p-phenylenediamine,
N-sec-hexadecyl-p-phenylenediamine,
N-sec-heptadecyl-p-phenylenediamine,
N-sec-octadecyl-p-phenylenediamine,
N-sec-nonadecyl-p-phenylenediamine,
N-sec-eicosyl-p-phenylenediamine, etc.

In general, the p-phenylenediamines are preferred although, in another embodiment of the invention, the corresponding ortho and meta phenylenediamines may be employed, as well as mixtures of the ortho, meta and/or para derivatives.

In still another embodiment the N-monoalkyl-aromatic diamine is an N-monoalkyl diaminodiphenyl compound including N-monoalkyl benzidine, N-monoalkyl diaminodiphenyl methanes, N-monoalkyl diaminodiphenyl ethanes, N-monoalkyl diaminodiphenyl propanes, N-monoalkyl diaminodiphenyl butanes, etc., N-monoalkyl diaminodiphenyl ethers, N-monoalkyl diaminodiphenyl amines, N-monoalkyl diaminodiphenyl sulfides, N-monoalkyl diaminodiphenyl sulfones, N-monoalkyl diaminodiphenyl sulfoxides, N-monoalkyl diaminodiphenyl phosphates, etc. The alkyl group is selected from the specific alkyl groups hereinbefore set forth in the description of the N-monoalkyl phenylenediamines. In general, it is preferred that the N-monoalkylamino and the amino groups are in the positions of 4,4', 2,4' and/or 4,2', although they may be in the 3,3', 3,4' or 4,3', etc. positions or a mixture thereof.

As hereinbefore set forth, it is preferred that the alkyl group is a secondary alkyl group, and the desired N-monoalkyl-aromatic diamines are prepared by the reaction of the aromatic diamine with a ketone. The N-monoalkyl-aromatic diamine is separated from the other products of the process by fractionation or otherwise. However, in another embodiment of the invention, the alkyl group is a normal alkyl group and such N-monoalkyl-aromatic diamines are prepared by reacting the aromatic diamine with the desired aldehyde. It is understood that the normal alkyl group will correspond to the secondary alkyl groups hereinbefore specifically set forth. In another method of preparation, nitrochlorobenzene is reacted with an alkylamine to form the N-alkyl nitrobenzene which then is reduced to the corresponding N-monoalkyl phenylenediamine. It is understood that any suitable method of manufacturing the N-monoalkyl-aromatic diamine may be used for the purposes of the present invention.

As hereinbefore set forth, the isocyanate-terminated prepolymer is prepared by the reaction of a polyisocyanate compound with a polyol or hydroxyl terminated polyester containing 2 hydroxyl groups. A preferred diisocyanate is toluene-2,4-diisocyanate or the commercially available mixture of from about 60 to about 90% by weight of toluene-2,4-diisocyanate and from about 10 to about 40% by weight of toluene-2,6-diisocyanate. Other diisocyanates include 4-methoxy-1,3-phenylene diisocyanate,
4-isopropyl-1,3-phenylene diisocyanate,
4-ethoxy-1,3-phenylene diisocyanate,
2,4'-diisocyanatodiphenylether,
3,3'-dimethyl-4,4'-diisocyanatodiphenylmethane,
1,5-naphthylenediisocyanate,
mesitylenediisocyanate,
durylenediisocyanate,
xylylenediisocyanate,
hexamethylenediisocyanate, etc.

Triisocyanates include toluene-2,4,6-triisocyanate, 2,4,4'-triisocyanatodiphenylether, 2,4,4' - triisocyanatodiphenylmethane, etc. It is understood that a mixture of the polyisocyanates may be employed.

Any suitable polyol or hydroxyl terminated polyester containing two hydroxyl group is reacted with the polyisocyanate. Illustrative polyols include polypropyleneether glycol, 1,2-polydimethylethyleneether glycol, ethylene oxide-modified polypropyleneether glycol, polytrimethyleneether glycol, polytetramethyleneether glycol, polypentamethyleneether glycol, polydecamethyleneether glycol, polytetramethyleneformal glycol, etc. Polypropyleneether glycol and polytetramethyleneether glycol are preferred. Particularly preferred is polytetramethyleneether glycol having a molecular weight of from about 400 to about 2000. In another embodiment, polyalkylenearyleneether glycols are used. These correspond to the polyalkyleneether glycols, except that some of the alkylene radicals have been replaced by arylene radicals, preferably phenylene and naphthylene radicals.

Polyesters containing two hydroxyl groups are prepared from diabasic acids including, for example, adipic acid, phthalic acid, sebacic acid, etc. Other dibasic acids include oxalic acid, malonic acid, succinic acid, suberic acid, azelaic acid, maleic acid, etc., as well as anhydrides thereof including succinic anhydride, phthalic anhydride, etc. These esters are prepared by the reaction of the dibasic acid with a diol including, for example, ethylene glycol, propylene glycol, 1,3-propanediol, thiodiglycol, diethylene glycol, 1,2-alkylene oxide-modified glycol, etc.

The isocyanate-terminated polyurethane prepolymer is prepared in any suitable manner and generally by the reaction of the isocyanate and polyol or polyester in an anhydrous atmosphere at room temperature or mild elevated temperature up to about 150° C. A molecular excess of the polyisocyanate is used and this excess may range up to 2 moles of diisocyanate per mole of glycol or dihydroxylic polyester. The mixture is agitated to secure thorough mixing of the reactants for a time which may range from 0.5 to 10 hours or more. Generally, a longer time is required with a lower temperature. When desired, the reaction may be effected in the presence of a solvent. Any suitable solvent which is non-reactive to isocyanate groups may be employed, including, for example, aromatic hydrocarbons such as toluene, xylene, ethylbenzene, etc., and voltaile oxygen-containing solvents such as methyl ethyl ketone, methyl acetate, or a mixture of these solvents. In one method, the polyol or polyester is dissolved in the solvent and then the isocyanate is added thereto with thorough mixing.

The isocyanate-terminated prepolymer generally is a solid or viscous mass at room temperature and conveniently is prepared in a solvent as hereinbefore set forth to form a clear non-viscous liquid. In general, the prepolymer is in a concentration of more than 50% by weight of the solution and more particularly from about 50% to about 75% by weight of the solution.

The isocyanate-terminated prepolymer is cured with the N-monoalkyl-aromatic diamine in any suitable manner. The curing agent is used in a concentration sufficient to react with at least 75% of the isocyanate groups and preferably up to 100% of the isocyanate groups, although an excess of the curing agent may be employed to insure complete reaction. The concentration of curing agent, accordingly, will depend upon the particular prepolymer and the particular curing agent employed. In one method, these are mixed at ambient temperature (10–25° C.) or a mild elevated temperature up to about 100° C. As hereinbefore set forth, the use of the N-monoalkyl-aromatic diamine results in a pot life which may range from 2 minutes to about 2 hours. This permits transporting the mixture from the mixing zone into molds, castings, etc., without gelling or premature curing. Final curing then is obtained by heating the mixture in the mold, casting or other desired form at a temperature of from about 100° to 200° C. or more for a period of from about 1 to 5 hours or more. When a non-foam resin is desired, the mixing and curing is effected under substantially anhydrous conditions. However, when a foam is desired, the curing is effected in the presence of moisture, either the moisture contained in the atmosphere or added water, and/or by blowing the mixture with a suitable gas such as carbon dioxide, trichloro monofluoro methane, etc.

As hereinbefore set forth, the resin formed by curing with the N-monoalkyl-aromatic diamine is a flexible, soft, elastic material having many of the properties of rubber. In contrast, prepolymers cured with 3,3'-dichlorobenzidine or methylene-bis-ortho-chloroaniline form a hard rubbery material which does not possess the flexibility of the resins cured in accordance with the present invention.

The following examples are introduced to illustrate further the novelty and utility of the present invention but not with the intention of unduly limiting the same.

*Example I*

The prepolymer of this example is available commercially under the trade name of "Adiprene L–100" from du Pont, and is believed to be prepared by the reaction of toluene-2,4,-diisocyanate and anhydrous polytetramethyleneether glycol. One preparation comprises agitating 278 parts of toluene-2,4-diisocyanate and 1000 parts of anhydrous polytetramethyleneether glycol (molecular weight 1000) at 80° C. for 4 hours in a dry reaction vessel protected from atmospheric moisture. The prepolymer thus obtained has a free polyisocyanate content of 4.2%, a Brookfield viscosity at 30° C. of about 16,500 cps., and an average molecular weight of about 2000.

The curing agent used in this example is N-(1-ethyl-3-methylpentyl)-p-phenylenediamine. In one run, the curing agent and prepolymer were mixed in a proportion of 9.1 parts of curing agent per 100 parts of prepolymer. These were added at room temperature and stirred for 1 minute while heating slightly. The mixture then was poured into a slab rubber mold and cured for 3 hours at 100° C. This produced a sheet of resin which was cut into strips for physical evaluations.

The resin formed in the above manner was a soft, flexible, elastic material. It had a tensile strength of about 1325 p.s.i., a 100% modulus of about 275, a 200% modulus of about 375 and a Shore A hardness of 60.

*Example II*

As hereinbefore set forth, when samples of the same prepolymer were cured with 3,3'-dichlorobenzidine in substantially the same manner described in Example I, the resin was a hard rubbery material. This resin had a Shore A hardness of 94.

From a comparison of the product formed as described in Example I and the product formed as described in Example II, it will be seen that entirely different types of products are formed. The product of Example I is a soft, flexible material having many of the properties of rubber, whereas the product formed in accordance with Example II was hard and does not possess the same softness and flexibility. The softness is of advantage for use in mattings, cushions, etc.

Example III

When methylene-bis-ortho-chloroaniline is used as a curing agent, a hard rubbery product is formed which is similar to that obtained when curing with 3,3'-dichlorobenzidine.

Example IV

As hereinbefore set forth, the use of the N-monoalkyl-aromatic diamine as curing agent offers the important advantage of practical pot life. This is surprising in view of the fact that when p-phenylenediamine is used as a curing agent in substantially the same manner described in Example I, the reaction is too fast and, therefore, does not permit sufficient time for transferring the mixture into the mold or other forming apparatus.

Example V

As an essential feature of the present invention, it is necessary that the curing agent is an N-monoalkyl-aromatic diamine. This is illustrated in the present example in which another sample of the prepolymer was cured with N,N'-di-sec-alkyldiaminodiphenyl methane in substantially the same manner described in Example I. The resulting product was a very soft, tacky material.

Example VI

The curing agent of this example is N-sec-butyl-p-phenylenediamine. It is mixed at room temperature with another sample of the prepolymer described in Example I and the mixture is poured into molds and then cured at 100° C. for 3.5 hours.

Example VII

The curing agent of this example is N-isopropyl-4,4'-diaminodiphenyl methane. It is mixed with another sample of the prepolymer described in Example I in a proportion of 11 parts by weight per 100 parts by weight of prepolymer and mixed and heated for 5 minutes at 80° C. The resulting mixture then is placed into molds and cured at 110° C. for 2.5 hours.

Example VIII

The curing agent of this example is N-sec-hexyl-diaminodiphenyl methane and is used as the curing agent with another sample of the prepolymer described in Example I in substantially the same manner described in Example VII.

Example IX

The curing agent of this example is 2-sec-heptylamino-4'-aminodiphenyl ether. It is mixed with another sample of the prepolymer described in Example I, the mixture placed into the molds and then cured at 105° C. for 3 hours.

Example X

The curing agent of this example is N-sec-decyl-ortho-phenylenediamine. It is commingled with an isocyanate-terminated polyurethane polymer prepared as follows. 200 parts of polypropyleneether glycol of a molecular weight of 1000, 20.8 parts of 1,5-pentanediol, 53.6 parts of trimethylolpropane and 238 parts of xylene are stirred together in a vessel with a reflux condenser. 283 parts of a mixture of 80% toluene-2,4-diisocyanate and 20% toluene-2,6-diisocyanate are added gradually while stirring, the reaction being exothermic and the temperature rising to 80° C. The temperature is maintained at about 80° C. by adjusting the rate of addition of the diisocyanate. Stirring is continued at 80° C. after the addition of all of the diisocyanate. An isocyanate-terminated polymer of 70% solids is recovered from the reaction mixture. After mixing, stirring and mildly heating the mixture of curing agent and prepolymer, the mixture is placed into a mold and cured in a furnace at 120° C. for 2 hours.

Example XI

The curing agent of this example is N-sec-octyl-benzidine. It is admixed with another sample of the prepolymer described in Example X and the mixture is heated at 75° C. and stirred. The mixture then is placed into a mold and cured in the mold at 100° C. for 3 hours.

Example XII

A polyurethane foam is prepared in substantially the same manner described in Example I, but the mixing is effected in the presence of added water. The water reacts with the excess diisocyanate to release carbon dioxide which, in turn, causes foaming to occur. The foam then is cured at a temperature of 110° C. for 3 hours.

We claim as our invention:

1. A method of curing an isocyanate-terminated polyurethane prepolymer formed by the reaction of a polyisocyanate with a polyalkyleneether glycol, which comprises mixing with said prepolymer a curing agent consisting essentially of an N-monoalkyl-aromatic diamine in an amount sufficient to react with at least 75% of the isocyanate groups of the prepolymer, the alkyl substitution being on only one of the amine groups of said diamine, and heating the resultant mixture to a temperature of at least about 100° C. for a period of at least one hour to produce an elastomer.

2. The method of claim 1 further characterized in that said prepolymer and diamine are admixed at a temperature of from ambient to about 100° C. and the mixture is heated at a temperature of from about 100° C. to about 200° C.

3. The method of claim 1 further characterized in that said diamine is an N-alkyl-p-phenylenediamine.

4. The method of claim 1 further characterized in that said diamine is an N-sec-octyl-p-phenylenediamine.

5. The method of claim 1 further characterized in that said diamine is an N-monoalkyl diaminodiphenyl alkane.

References Cited by the Examiner

UNITED STATES PATENTS

| 2,888,440 | 5/1954 | Frazer | 260—77.5 |
|---|---|---|---|
| 3,036,996 | 5/1962 | Kogon | 260—77.5 |
| 3,044,990 | 7/1962 | Steuber | 260—77.5 |
| 3,044,991 | 7/1962 | Muller | 260—77.5 |
| 3,194,793 | 7/1965 | Kogon | 260—77.5 |

FOREIGN PATENTS

| 1,100,946 | 3/1961 | Germany. |
|---|---|---|

LEON J. BERCOVITZ, *Primary Examiner.*

M. C. JACOBS, *Assistant Examiner.*